United States Patent
Curran et al.

(10) Patent No.: US 12,086,739 B2
(45) Date of Patent: *Sep. 10, 2024

(54) CIP WASH SUMMARY AND LIBRARY

(71) Applicant: Ecolab USA Inc., Saint Paul, MN (US)

(72) Inventors: Joseph P. Curran, Mahtomedi, MN (US); Finn Jensen, Arden (DK); Jonathan Kingsbury, Apple Valley, MN (US); Paul Schacht, Oakdale, MN (US); Juli Young, Farmington, MN (US); James Krohn, Oakdale, MN (US)

(73) Assignee: Ecolab USA, Inc., Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/986,239

(22) Filed: Aug. 5, 2020

(65) Prior Publication Data

US 2020/0364633 A1    Nov. 19, 2020

Related U.S. Application Data

(62) Division of application No. 14/818,028, filed on Aug. 4, 2015, now Pat. No. 10,755,210.

(Continued)

(51) Int. Cl.
*G06Q 10/06* (2023.01)
*G06Q 10/0631* (2023.01)
*G06Q 10/0633* (2023.01)

(52) U.S. Cl.
CPC ..... *G06Q 10/0631* (2013.01); *G06Q 10/0633* (2013.01)

(58) Field of Classification Search
None
See application file for complete search history.

(56) References Cited

U.S. PATENT DOCUMENTS 2,897,829 A    8/1959 Arrington et al.
4,061,504 A   12/1977 Zall et al.
(Continued)

OTHER PUBLICATIONS

Jude, Benjamin, and Eric Lemaire. "How to optimize clean-in-place (CIP) processes in food and beverage operations." Schneider Electric White Paper 2013 (2013). (Year: 2013).*
(Continued)

*Primary Examiner* — Darlene Garcia-Guerra
(74) *Attorney, Agent, or Firm* — Fredrikson & Byron, P.A.

(57) ABSTRACT

One embodiment includes a method for monitoring a CIP process previously performed. The method includes accessing CIP process data stored in a CIP library. The CIP process data includes CIP phase data associated with a plurality of CIP phases in the CIP process previously performed, equipment data associated with objects used in the CIP process during one or more of the CIP phases, and consumable data associated with consumables consumed by corresponding equipment in the CIP process. In addition, the method includes displaying at least a portion of the CIP process data, and providing a graphical user interface. The graphical user interface is configured to: organize the CIP process data into at least one of (i) a plurality of CIP phases or (ii) consumable data, and sort equipment data according to one or more of the plurality of corresponding CIP phases or corresponding consumables.

5 Claims, 8 Drawing Sheets

| Most Recent 20 Washes* | | | | | | | View All | |
|---|---|---|---|---|---|---|---|---|
| Start Date / Time (HH:MM:SS) | Duration (HH:MM:SS) | CIP System | CIP Line | Object | Recipe | Total Cost (USD) | Exceptions Triggered | |
| 06:20:43 AM | 00:35:06 | CS403 | CS403L | 503 - HTST 2 to JT 1-2 | | $2.73 | ✓ | |
| 05:54:29 AM | 00:51:44 | CS302 | CS302L | 103 - RT-2 | | $13.81 | ✓ | |
| 05:24:52 AM | 00:46:35 | CS403 | CS403L | 112 - JT-1 | | $2.93 | ✓ | |
| 05:18:55 AM | 00:54:41 | CS402 | CS402L | 203 - PT-9 | | $14.21 | ✓ | |
| 04:39:18 AM | 00:13:05 | CS404 | CS404L | 256 - F2 - Half-Gallon Federal | | $1.14 | | |
| 01:23:15 AM | 01:08:28 | CS302 | CS302L | 501 - LN501 | | $19.56 | | |
| 12:17:48 AM | 00:28:04 | CS301 | CS301L | 152 - Bay #2 Rear | | $3,468.75 | ✓ | |
| 11:15:14 PM | 00:32:34 | CS302 | CS302L | 153 - Bay #3 | | $6.45 | ✓ | |
| 11:07:54 PM | 02:21:50 | CS401 | CS401L | 602 - PT to Fillers | | $28.32 | ✓ | |
| 10:42:55 PM | 00:29:26 | CS303 | CS303L | 151 - Bay #1 Rear | | $5.01 | ✓ | |
| Items per page 10 | | | Displaying 1 - 10 of 20 | | | Page 1 of 2 | | |

Related U.S. Application Data (60) Provisional application No. 62/038,003, filed on Aug. 15, 2014.

(56) References Cited

U.S. PATENT DOCUMENTS

| | | | |
|---|---|---|---|
| 4,230,592 | A | 10/1980 | Miller et al. |
| 4,258,070 | A | 3/1981 | Ridgway, Jr. et al. |
| 4,836,420 | A | 6/1989 | Kromrey |
| 5,047,164 | A | 9/1991 | Corby |
| 5,064,561 | A | 11/1991 | Rouillard |
| 5,282,889 | A | 2/1994 | Franklin |
| 5,348,058 | A | 9/1994 | Ruhl |
| 5,405,452 | A | 4/1995 | Anderson et al. |
| 5,417,153 | A | 5/1995 | King et al. |
| 5,427,126 | A | 6/1995 | Carney et al. |
| 5,533,552 | A | 7/1996 | Ahlers |
| 5,603,826 | A | 2/1997 | Welch |
| 5,888,311 | A | 3/1999 | Laufenberg et al. |
| 6,006,171 | A | 12/1999 | Vines et al. |
| 6,071,356 | A | 6/2000 | Olsen |
| 6,089,242 | A | 7/2000 | Buck |
| 6,136,362 | A | 10/2000 | Ashton |
| 6,161,558 | A | 12/2000 | Franks et al. |
| 6,287,515 | B1 | 9/2001 | Koosman et al. |
| 6,391,122 | B1 | 5/2002 | Votteler et al. |
| 6,423,675 | B1 | 7/2002 | Coughlin et al. |
| 6,669,051 | B1* | 12/2003 | Phallen ............ B67C 3/28 222/394 |
| 7,249,356 | B1 | 7/2007 | Wilson et al. |
| 7,529,688 | B2 | 5/2009 | Prakash |
| 8,984,360 | B2 | 3/2015 | Al Za'Noun et al. |
| 9,417,078 | B1 | 8/2016 | Seibert |
| 9,898,786 | B2 | 2/2018 | Brown |
| 10,083,255 | B2* | 9/2018 | Majewski ............ G06F 30/20 |
| 2002/0035457 | A1 | 3/2002 | Brown |
| 2004/0016447 | A1* | 1/2004 | Nagai ............ B08B 3/10 134/10 |
| 2004/0118291 | A1* | 6/2004 | Carhuff ............ A47J 31/401 99/275 |
| 2004/0187897 | A1 | 9/2004 | Kenowski et al. |
| 2004/0236522 | A1* | 11/2004 | Howes, Jr. ............ A47L 15/0063 702/31 |
| 2005/0102059 | A1* | 5/2005 | Gardner, Jr. ............ D06F 39/02 700/244 |
| 2005/0166660 | A1* | 8/2005 | Ammann ............ G01N 27/4165 73/1.01 |
| 2005/0183744 | A1* | 8/2005 | Staub ............ B08B 9/0321 134/26 |
| 2006/0046945 | A1* | 3/2006 | Herdt ............ C11D 3/2075 510/234 |
| 2006/0059018 | A1 | 3/2006 | Shiobara et al. |
| 2007/0017448 | A1 | 1/2007 | Stevens et al. |
| 2007/0192152 | A1* | 8/2007 | Frank ............ G06Q 10/06316 705/7.11 |
| 2008/0057830 | A1 | 3/2008 | Molnar |
| 2008/0210262 | A1 | 9/2008 | Lauzon |
| 2009/0043625 | A1 | 2/2009 | Yao |
| 2009/0265025 | A1 | 10/2009 | Brown |
| 2010/0076809 | A1 | 3/2010 | Eryurek et al. |
| 2010/0093078 | A1 | 4/2010 | Wang et al. |
| 2010/0139701 | A1 | 6/2010 | Bigott |
| 2010/0274640 | A1 | 10/2010 | Morey et al. |
| 2011/0056522 | A1 | 3/2011 | Zauner et al. |
| 2011/0152156 | A1 | 6/2011 | Sauter et al. |
| 2011/0197920 | A1* | 8/2011 | Kenowski ............ B67D 1/07 134/10 |
| 2011/0207916 | A1 | 8/2011 | Kyhse-Andersen |
| 2011/0236932 | A1 | 9/2011 | Stobbe |
| 2012/0059607 | A1* | 3/2012 | Rebec ............ G06K 9/0055 702/61 |
| 2012/0070553 | A1 | 3/2012 | Hockett et al. |
| 2012/0158446 | A1 | 6/2012 | Mayerle et al. |
| 2013/0073450 | A1 | 3/2013 | Swan |
| 2013/0199511 | A1 | 8/2013 | Laessig |
| 2013/0206699 | A1* | 8/2013 | Scheu ............ B01D 24/48 210/660 |
| 2013/0278635 | A1* | 10/2013 | Maggiore ............ G06F 3/0304 345/633 |
| 2013/0313191 | A1* | 11/2013 | Wolf ............ C02F 9/00 210/638 |
| 2014/0073820 | A1 | 3/2014 | Bazzana et al. |
| 2014/0090606 | A1 | 4/2014 | Heacox |
| 2014/0155312 | A1 | 6/2014 | Soontravanich et al. |
| 2014/0170276 | A1 | 6/2014 | Nelles et al. |
| 2014/0209127 | A1* | 7/2014 | Pathak ............ C11D 1/83 510/234 |
| 2014/0245208 | A1* | 8/2014 | Javey ............ G06F 3/0484 715/771 |
| 2014/0273150 | A1 | 9/2014 | Angel |
| 2014/0352728 | A1* | 12/2014 | Svensson ............ A23C 7/02 99/452 |
| 2015/0005699 | A1* | 1/2015 | Burbank ............ A61M 1/154 604/29 |
| 2015/0096498 | A1* | 4/2015 | Torgerson ............ A01J 5/16 119/14.08 |
| 2015/0135016 | A1 | 5/2015 | Glaser et al. |
| 2015/0296739 | A1 | 10/2015 | Nelles et al. |
| 2015/0363750 | A1 | 12/2015 | Svensson et al. |
| 2016/0008859 | A1* | 1/2016 | Høxbroe ............ B05B 15/14 134/113 |
| 2016/0016825 | A1* | 1/2016 | Roberts ............ C02F 1/441 210/186 |
| 2016/0045943 | A1 | 2/2016 | Curran et al. |
| 2016/0046503 | A1 | 2/2016 | Hoek et al. |
| 2016/0051936 | A1 | 2/2016 | Kim et al. |
| 2016/0185474 | A1 | 6/2016 | Bronner et al. |
| 2016/0185584 | A1 | 6/2016 | Hayakawa et al. |
| 2016/0312159 | A1 | 10/2016 | Athneil |

OTHER PUBLICATIONS

Lees, Michael, et al. "A real-time utilities management system for optimising cleaning operations in a brewery." 2009 IEEE International Conference on Industrial Technology. IEEE, 2009 (Year: 2009).*

Barron, Wendy. "Conserving resources—cleaning chemicals." International Journal of Dairy Technology 40.1 (1987): (Year: 1987).*

Pettigrew, Liam, et al. "Optimisation of water usage in a brewery clean-in-place system using reference nets." Journal of Cleaner Production 87 (2015): 583-593 (Year: 2015).*

Bremer, Philip J., Suzanne Fillery, and A. James McQuillan. "Laboratory scale Clean-In-Place (CIP) studies on the effectiveness of different caustic and acid wash steps on the removal of dairy biofilms." International journal of food microbiology 106.3 (2006): 254-262 (Year: 2006).*

Melero, Valdir, et al. "Experimental investigation about rinse water consumption of a CIP process applied to a shell and tube exchanger." Advanced Materials Research. vol. 785. Trans Tech Publications Ltd, 2013 (Year: 2013).*

Schöler, Martin, et al. "Local analysis of cleaning mechanisms in CIP processes." Food and bioproducts processing 90.4 (2012): 858-866 (Year: 2012).*

Alvarez, Nicolas, Georges Daufin, and Geneviève Gésan-Guiziou. "Recommendations for rationalizing cleaning-in-place in the dairy industry: Case study of an ultra-high temperature heat exchanger." Journal of dairy science 93.2 (2010): 808-821 (Year: 2010).*

CIP and Sanitation of Process Plant, SPX Flow Technology, White Paper, Feb. 2013, 24 pages.

European Patent Application No. 15831632.3, Extended European Search Report mailed Jan. 3, 2018, 7 pages.

Jude et al., "How to Optimize Clean-in-Place (CIP) Processes in Food and Beverage Operations," Schneider Electric, White Paper, Revision 0, www.schneider-electric.us/en/download/document/998-2095-12-09-13ARO_EN/, Dec. 9, 2013, 11 pages.

International Patent Application No. PCT/US2015/043640, International Search Report and Written Opinion mailed Nov. 19, 2015, 10 pages.

(56) References Cited

OTHER PUBLICATIONS

Paraga, "Improve Operations Productivity," Rockwell Automation, https://www.rockwellautomation.com/Resources/Downloads/Rockwellautomation/Pdf/Events/Automation-Fair/2012/Tech-Sessions/t49_design-Considerations-Auto-and-Manual-Batch.pdf, Nov. 5-6, 2012, 83 pages.

Sinclair et al., "Quantitative Economic Evaluation of Single Use Disposables in Bioprocessing," Pharmaceutical Engineering, vol. 22, No. 3, May/Jun. 2002, pp. 1-9.

Wang et al., "Electrolyzed Oxidizing Water for Cleaning-In-Place of On-Farm Milking Systems—Performance Evaluation and Assessment," Applied Engineering in Agriculture, vol. 29, No. 5, 2013, pp. 717-726.

\* cited by examiner

| Phases Summary | | | Phase Detail - Consumption | | | | |
|---|---|---|---|---|---|---|---|
| Phase Name | Phase Start Time | Phase Duration | Material Category | Material/Fact Name | Amount | UOM | < |
| PreRinse | 16:36:43 | 00:02:16 | Electrical Energy | CS301_ReturnPump | 0.42 | kWh | |
| | | | | CS301_Supplypump | 0.22 | kWh | |
| | | | Water | City Water | 129.95 | gal | |
| | | | Chemical | Exelerate CIP | 0.47 | gal | |
| Alkaline Heat to Temperature | 16:38:59 | 00:07:50 | Electrical Energy | CS301_ReturnPump | 1.46 | kWh | |
| | | | | CS301_Supplypump | 1.46 | kWh | |
| | | | Thermal Energy | Thermal | 0.39 | Dth | |

310 — PreRinse row
320 — Alkaline Heat to Temperature row
300 — table

Exceptions

⚙ >> Exceptions >> Exceptions Triggered

| | Wash Exceptions | Fact Exceptions | | | | | | | | |
|---|---|---|---|---|---|---|---|---|---|---|
| | Exception ID ▽ | Exception Name ▽ | Exception Date & Time ▽ | CIP System ▽ | CIP Line ▽ | Object ▽ | Recipe ▽ | Wash Start Date/Time ▽ | Message Sent | Wash Summary ▽ |
| 510 → | 10 | Pre-rinse over 10 minutes, sanitizer value less than $2, wash temp outside 140-160 CS-301 | 06:52:36 | CS301 | CS301L | 152 - Bay#2 Rear | 0 | 06:52:36 | | ◇ |
| 520 → | 16 | Pre-rinse over 10 minutes, sanitizer value less than $2, wash temp outside 140-160 CS-402 Tanks | 04:50:23 | CS402 | CS402L | 212 - BM Vat A | 0 | 04:50:23 | | ◇ |

FIG. 5

Wash Library

« > Wash Library

Wash Library

| Start Date/Time | Duration | CIP System Name | CIP Line Name | Object | Recipe | Total cost (USD) |
|---|---|---|---|---|---|---|
| 14:30:32 | 00:41:10 | CS403 | CS403L | 504 - Cream Loadout | 504 | $ 15.50 |
| 14:18:51 | 00:09:30 | CS403 | CS403L | 111 - MT-4 | 111 | $ 1.26 |
| 13:37:23 | 00:23:04 | CS302 | CS302L | 504 - LN504 | 504 | $ 7.95 |
| 13:31:57 | 00:31:53 | CS303 | CS303L | 151 - Bay #1 Rear | 151 | $ 8.43 |
| 13:12:56 | 00:14:04 | CS406 | CS406L | 252 - F6 - H5 Filler | 4 | $ 2.09 |
| 12:43:59 | 00:33:22 | CS302 | CS302L | 153 - Bay #3 | 153 | $ 11.69 |
| 12:39:39 | 01:02:04 | CS402 | CS402L | 201 - PT-11 | 201 | $ 9.62 |
| 10:28:07 | 00:55:03 | CS402 | CS402L | 201 - PT-10 | 202 | $ 7.65 |

Most Recent 20 Washes*

| Start Date / Time (HH:MM:SS) | Duration (HH:MM:SS) | CIP System | CIP Line | Object | Recipe | Total Cost (USD) | Exceptions Triggered |
|---|---|---|---|---|---|---|---|
| 06:20:43 AM | 00:35:06 | CS403 | CS403L | 503 - HTST 2 to JT 1-2 | | $2.73 | ◇ |
| 05:54:29 AM | 00:51:44 | CS302 | CS302L | 103 - RT-2 | | $13.81 | ◇ |
| 05:24:52 AM | 00:46:35 | CS403 | CS403L | 112 - JT-1 | | $2.93 | ◇ |
| 05:18:55 AM | 00:54:41 | CS402 | CS402L | 203 - PT-9 | | $14.21 | ◇ |
| 04:39:18 AM | 00:13:05 | CS404 | CS404L | 256 - F2 - Half-Gallon Federal | | $1.14 | |
| 01:23:15 AM | 01:08:28 | CS302 | CS302L | 501 - LN501 | | $19.56 | |
| 12:17:48 AM | 00:28:04 | CS301 | CS301L | 152 - Bay #2 Rear | | $3,468.75 | ◇ |
| 11:15:14 PM | 00:32:34 | CS302 | CS302L | 153 - Bay #3 | | $6.45 | ◇ |
| 11:07:54 PM | 02:21:50 | CS401 | CS401L | 602 - PT to Fillers | | $28.32 | ◇ |
| 10:42:55 PM | 00:29:26 | CS303 | CS303L | 151 - Bay #1 Rear | | $5.01 | ◇ |

Items per page [10 ▼]   Displaying 1 - 10 of 20   [<<] [<] Page [1] of 2 [>] [>>]

FIG. 8

CIP WASH SUMMARY AND LIBRARY

This application is a divisional of U.S. patent application Ser. No. 14/818,028, filed Aug. 4, 2015, which claims priority to U.S. Provisional Patent Application No. 62/038,003, filed Aug. 15, 2014. The entire contents of these applications are incorporated herein by reference. U.S. patent application Ser. No. 14/818,015, entitled "CIP WASH COMPARISON AND SIMULATION," filed Aug. 4, 2015, is related to this application.

TECHNICAL FIELD

This disclosure relates generally to clean-in-place systems and processes, and data pertaining to clean-in-place systems and processes.

BACKGROUND

Food processing equipment, such as that found in dairies, tanks, pumps, valves and fluid piping, typically includes tanks, pumps, valves, and fluid piping. This food processing equipment often needs to be cleaned between each lot of product processed through the equipment. However, the tanks, pumps, valves, and piping can be difficult to clean because the various components may be difficult to access and disassemble for cleaning. Because of these cleaning difficulties, many food processing plants now use clean-in-place systems in which the tanks, pumps, valves, and piping of the food processing equipment remain physically assembled, and various cleaning, disinfecting, and rinsing solutions are circulated by the clean-in-place system through the food processing equipment to affect the cleaning process.

An example clean-in-place cleaning cycle normally begins with a pre-rinse cycle wherein water is pumped through the food processing equipment for the purpose of removing loose soil in the system. Typically, an alkaline wash would then be recirculated through the food processing equipment. This alkaline wash would chemically react with the soils of the food processing equipment to further remove soil. A third step would again rinse the food processing equipment with water, prior to a fourth step wherein an acid rinse would be circulated through the batch processing system. The acid rinse would neutralize and remove residual alkaline cleaner and remove any mineral deposits left by the water. Finally, a post-rinse cycle would be performed, typically using water and/or a sanitizing rinse. Such clean-in-place systems (and associated cleaning compositions) are known in the art, and examples can be found in U.S. Pat. Nos. 6,423,675; 6,391,122; 6,161,558; 6,136,362; 6,089,242; 6,071,356; 5,888,311; 5,533,552; 5,427,126; 5,405,452; 5,348,058; 5,282,889; 5,064,561; 5,047,164; 4,836,420; and 2,897,829.

Clean-in-place processes can vary widely in complexity. Some clean-in-place processes include various pieces of equipment, sometimes called clean-in-place objects, operating in conjunction and/or in succession. Data regarding clean-in-place processes and object operation is often stored as an unorganized mass of data, and is often incomprehensible to those without extensive experience in the clean-in-place industry. As a result, a typical user of a system on which clean-in-place processes are performed is unable to analyze clean-in-place process data to notice areas of potential improvement or non-ideal operation in the clean-in-place process. Generally, the user does not have more than a very basic understanding of how operation of a system changes from process to process or how actions taken by the user can affect the system operation.

SUMMARY

This disclosure in general relates to systems and methods of cataloging, arranging, and viewing clean-in-place (CIP) data. The described embodiments can allow a local user to easily breakdown and view phase and other wash details of a CIP wash quickly and easily without the assistance of a CIP expert. In addition, troubleshooting to correct malfunctions within a CIP system can be facilitated by using the CIP data for diagnostic purposes. Moreover, the CIP data can allow a CIP system to more efficiently utilize consumables during one or more washes.

In various described embodiments, data is collected and assembled into a wash summary in order to provide a user with contextualized CIP data, enabling the user to quickly and easily observe wash details including information regarding various phases and consumables used in each phase and by each piece of operating equipment. A wash library allows a user to view a plurality of past, cataloged washes. From the wash library, a user can easily look up details from any saved wash. In addition, wash summaries and the wash library provides information to a user regarding the triggering of an exception during a particular wash or phase. This can provide the user immediate feedback regarding a certain predetermined event occurring within a wash.

One embodiment includes a method for monitoring a CIP process previously performed. The method includes accessing, using one or more programmable processors, CIP process data stored in a CIP library. The CIP process data includes CIP phase data associated with a plurality of CIP phases in the CIP process previously performed, equipment data associated with objects used in the CIP process during one or more of the CIP phases, and consumable data associated with consumables consumed by corresponding equipment in the CIP process. In addition, the method includes displaying, using the one or more programmable processors, at least a portion of the CIP process data, and providing, using the one or more programmable processors, a graphical user interface. The graphical user interface is configured to: organize the CIP process data into at least one of (i) a plurality of CIP phases or (ii) consumable data, and sort equipment data according to one or more of the plurality of corresponding CIP phases or corresponding consumables.

Another embodiment includes a method of generating and using a CIP library. The method includes receiving, using one or more programmable processors, CIP data sets, each CIP data set being associated with a CIP process previously performed having two or more CIP phases. Each CIP data set includes data for the associated CIP process relating to at least one of a CIP process duration, CIP system name, CIP line name, name of an object upon which the CIP process is carried out, CIP recipe used, and amount of consumables used. The method also includes, using one or more programmable processors, receiving a per-unit cost of the consumables used by equipment in the CIP processes, calculating the total cost of each CIP process, storing the CIP data sets in a data structure to form the CIP library, retrieving portions of one or more of the CIP data sets from the CIP library, displaying the retrieved portions of the one or more CIP data sets from the CIP library on a display, and providing a graphical user interface configured to sort and filter the displayed CIP data sets. The provided graphical user interface is configured to sort and filter displayed CIP data sets according to at least one of CIP process duration, CIP system name, CIP line name, name of the object upon which the CIP process is carried out, CIP recipe used, amount of consumables used, and the total cost of each CIP process. Each displayed CIP data set is selectable to expand the view of a selected CIP data set into subsets corresponding to each of the two or more phases.

A further embodiment includes a CIP system. The CIP system includes a CIP object including an input, a first chemistry in fluid communication with the input of the CIP object, a sensor configured to detect one or more operating conditions of the CIP system, and a controller in communication with the sensor. The controller is configured to control fluid communication between the first chemistry and the CIP object and to carry out a first CIP process including more than one phase on the CIP object according to a first recipe. The controller includes one or more programmable processors and a non-transitory computer-readable storage article having computer-executable instructions stored thereon to cause at least one programmable processor to receive CIP data sets, each CIP data set being associated with a CIP process having two or more CIP phases and performed previous to the first CIP process. Each CIP data set includes data for the associated CIP process relating to at least one of a CIP process duration, CIP system name, CIP line name, name of an object upon which the CIP process is carried out, CIP recipe used, and amount of consumables used. The processor is further caused to receive a per-unit cost of the consumables used in the CIP processes previously performed, calculate a total cost of each CIP process previously performed based at least in part on the received per-unit cost of the consumables used, store the CIP data sets in a data structure to form a CIP library, retrieve from the CIP library portions of one or more of the CIP data sets, display the retrieved portions of the one or more CIP data sets from the CIP library on a display, and provide a graphical user interface. The graphical user interface is configured to sort and filter the displayed CIP data sets according to at least one of CIP process duration, CIP system name, CIP line name, name of the object upon which the CIP process is carried out, CIP recipe used, amount of consumables used, and the total cost of each CIP process. Each displayed CIP data set is selectable to expand the view of a selected CIP data set into subsets corresponding to each of the two or more phases.

DETAILED DESCRIPTION

As described, clean-in-place (CIP) systems can be used to clean equipment without requiring disassembly of entire systems. In general, a CIP process is applied to one or more objects to be cleaned, hereinafter a "CIP object" or "object". Typical CIP objects can include, for example, tanks, silos, pumps, fillers, valve clusters, or objects that clean standalone, such as pasteurizers, separators, membrane filtration equipment, evaporators, driers. The object is cleaned by process of a CIP wash. A CIP wash can include one or more CIP phases. CIP phases are generally more specific than the wash itself, and in some examples are defined by a set of operating parameters within a CIP wash. For example, a CIP phase might include a rinse phase, during which water is passed through the CIP object in order to rinse the object. Other exemplary CIP phases can include a pre-rinse, a post-rinse, alkaline wash, acid sanitize, rinse recovery, chemical recovery, or sterilization. In general, a CIP wash can include one or more CIP phases.

CIP washes, and likewise CIP phases, can consume one or more consumables during the execution of a wash or phase. For example, auxiliary CIP equipment such as pumps, valves, etc. can consume electrical energy during operation. In addition, various phases can require the addition of water and/or one or more chemicals such as an alkaline or an acid (generally "chemistry"). In some such phases, water and/or chemistry is heated to a desired temperature, using thermal energy. Thus, exemplary consumables consumed during a CIP phase or a CIP wash can include electrical energy, thermal energy, water, chemistry, and time.

During a CIP wash, a series of pumps, valves, and other equipment can be used to perform various phases of the wash. Such equipment can be controlled, for example, by a controller configured to carry out CIP phases and washes. A controller can include memory for storing CIP wash and phase recipes indicating which valves to open and/or which pumps to activate at which times during a CIP wash. The controller can be programmed by a user to update or save new wash recipes.

Figure 1:
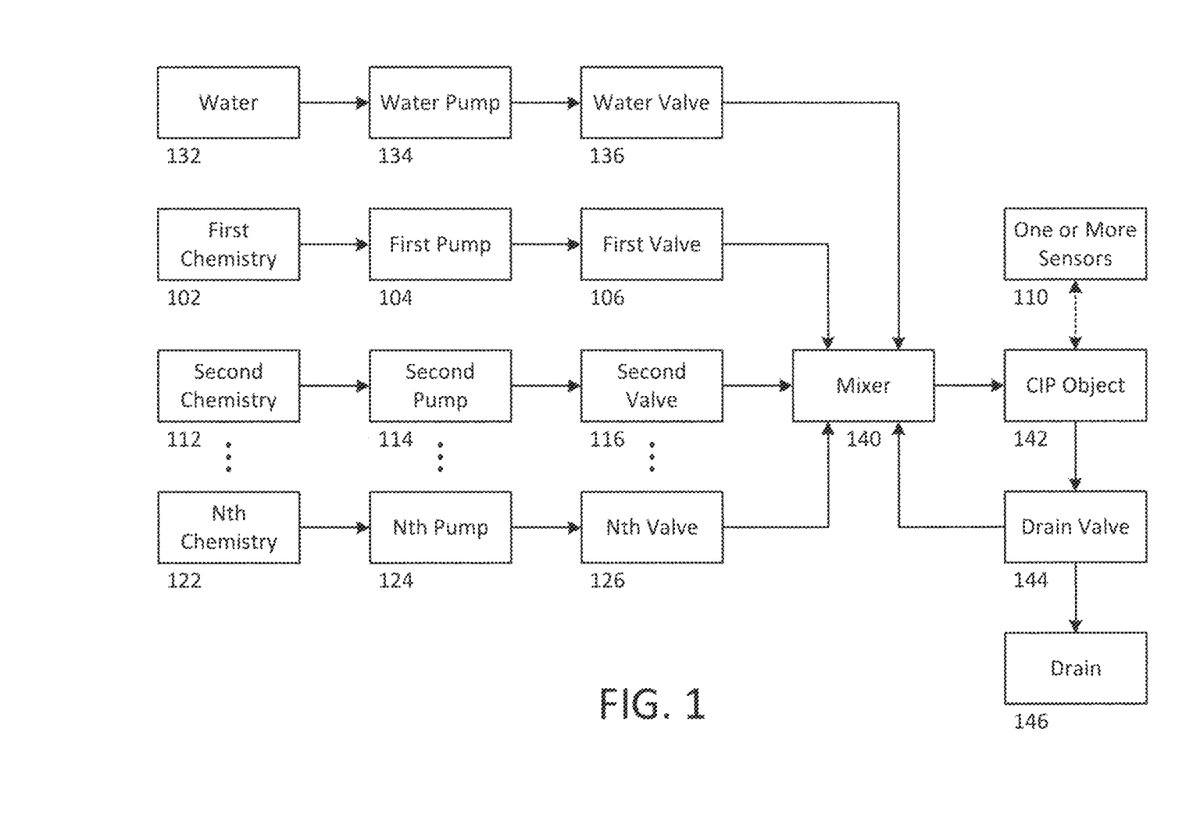
FIG. 1 is an exemplary schematic diagram of a CIP system.

FIG. 1 is an exemplary schematic diagram of a CIP system. As shown, a number of chemistries (first chemistry 102-Nth chemistry 122) are in communication with a CIP object 142. For simplicity, the fluid flow of first chemistry 102 will be explained in detail, however it will be clear that similar operation can be employed among each of the other chemistries. In the illustrated CIP system, the first chemistry 102 is pumped by a first pump 104 toward a mixer 140. The term mixer is used to describe the area where the chemical detergents are combined with the water source to create the cleaning solution. It can consist of either a hydraulically suited mixing line segment, a circulation tank, or simply the suction side of a delivery pump in the CIP circuit. A first valve 106 in the flow path of the first chemistry 102 can act to prevent the first chemistry 102 from reaching the mixer 140. In various embodiments, flow control can be performed by either the first valve 106, the first pump 104, or a combination thereof. In some embodiments, the first valve 106 is positioned ahead of the first pump 104 in the flow path of the first chemistry 102, while in other embodiments, the first valve 106 is positioned after the first pump 104.

The mixer 140 is configured to receive the first chemistry 102, as well as any other of the second chemistry 112 through Nth chemistry 122. The mixer 140 can also be configured to receive water 132 via a water line comprising a water pump 134 and a water valve 136 which can be arranged in a similar configuration as the chemistry input lines. In general, the mixer 140 can be any system component receiving chemistries and/or water intended to be directed toward the CIP object 142. In some embodiments, the mixer 140 can actively mix fluids therein, while in other embodiments, fluids merely are dispensed into the mixer 140 simultaneously. In some such embodiments, various chemistries and water are substantially mixed within the CIP object 142 during the CIP process and need not be mixed by the mixer 140. In general, the mixer 140 receives any combination of water 132 and any of the first 102 through Nth 122 chemistries prior to the combination of any such fluids being directed toward the CIP object 142.

In some embodiments, the timing and dosing of water 132 or any of first 102 through Nth 122 chemistries can be controlled by a controller (not shown) in communication with any corresponding pumps and/or valves. As discussed, various CIP washes and phases can be characterized by recipes stored in and/or carried out by the controller. For example, during a first phase, the controller may cause the first valve 106 to open and the first pump 104 to dose first chemistry 102 to the mixer 140 and CIP object 142. The controller can be configured to dose a predetermined volume of the first chemistry 102, to dose the first chemistry 102 for a predetermined amount of time, or to dose the predetermined chemistry 102 until a predetermined event occurs. At the completion of the first phase, the controller may stop the dosing of the first chemistry 102 by closing the first valve 106 and/or stopping the first pump 104. The controller can begin a second phase, for example, by dosing the second 112 and Nth 122 chemistries toward the mixer 140 via the second pump 114 and valve 116 and the Nth pump 124 and valve 126, respectively. The second 112 and Nth 122 chemistries can combine in the mixer 140 before being directed to the CIP object 142. In general, the controller can operate to dose any combination of chemistries toward the mixer 140 and CIP object 142. Such chemistries can be diluted as desired by further dosing water 132 via the water pump 134 and water valve 136. In addition, various phases may be preceded or followed by a rinse phase, in which water 132 is provided to the CIP object 142 to rinse away residual chemistries or other residue from the CIP object operation.

In general, the CIP object 142 has at least one input for receiving a solution from the mixer 140 and at least one output through which the solution exits the object. As shown in the illustrated figure, a solution exiting the CIP object 142 can encounter a drain valve 144, which can act to direct the fluid back to the mixer 140 or toward a drain 146. In some embodiments, CIP process solution is recycled and run through the system a plurality of times, while other times, the CIP process solution is directed through the CIP object 142 a single time before being sent to the drain 146. A controller can monitor the number of times that a solution has traveled through a CIP object 142 and can control the drain valve 144 according to the number of times the solution is intended to travel through the CIP object 142.

CIP systems can include one or more sensors 110 for detecting various operating conditions of the CIP system or a CIP process solution flowing therethrough. As shown in the illustrated embodiment, the one or more sensors 110 are shown as being in communication with the CIP object 142. However, it will be appreciated that the one or more sensors can be dispersed throughout the system, such as in the mixer 140, proximate the input or output of the CIP object 142, or any other appropriate position in the system. For example, one or more sensors 110 can be positioned in any of the water 132 or first 102 through Nth 122 chemistry lines to monitor properties of each individual line. Various sensors can include, for example, temperature sensors, conductivity sensors, optical sensors, flow meters, electricity consumption meters and the like. The one or more sensors 110 can be in communication with the controller for communicating readings thereto.

During a CIP process (e.g., wash, phase), data can be generated regarding the process. For example, data collected by the one or more sensors 110 of FIG. 1 throughout the duration of the process can be saved to memory by the controller. Exemplary types of data that can be stored include duration of various phases, the electrical or thermal energy consumed during various phases by various pieces of equipment, the temperature of CIP process fluid, an amount of water or chemistry used during a phase or a wash, or the like.

In general, a large amount of CIP data regarding various operating parameters can be stored. In typical CIP systems, this data is unorganized and can be complicated and difficult for untrained users to interpret. For instance, without expert knowledge of CIP systems, a typical operator may not be able to distinguish between various CIP phases or troubleshoot CIP process equipment malfunction with raw CIP data generated by a typical system.

In embodiments of the present invention, the controller can be configured to combine CIP data acquired during a CIP wash to better provide context to a system operator. For example, the controller can combine data such as valve positions, temperature, flow duration, etc. to determine when during a CIP wash various CIP phases begin and end. In some examples, the controller can collect and store data from CIP processes in a wash summary. Data can be grouped together by phase, by consumable, or by other logical parameters in order to provide specific phase, consumable, or other information regarding an entire wash. The wash summary can be saved as a whole to memory.

Figure 2:
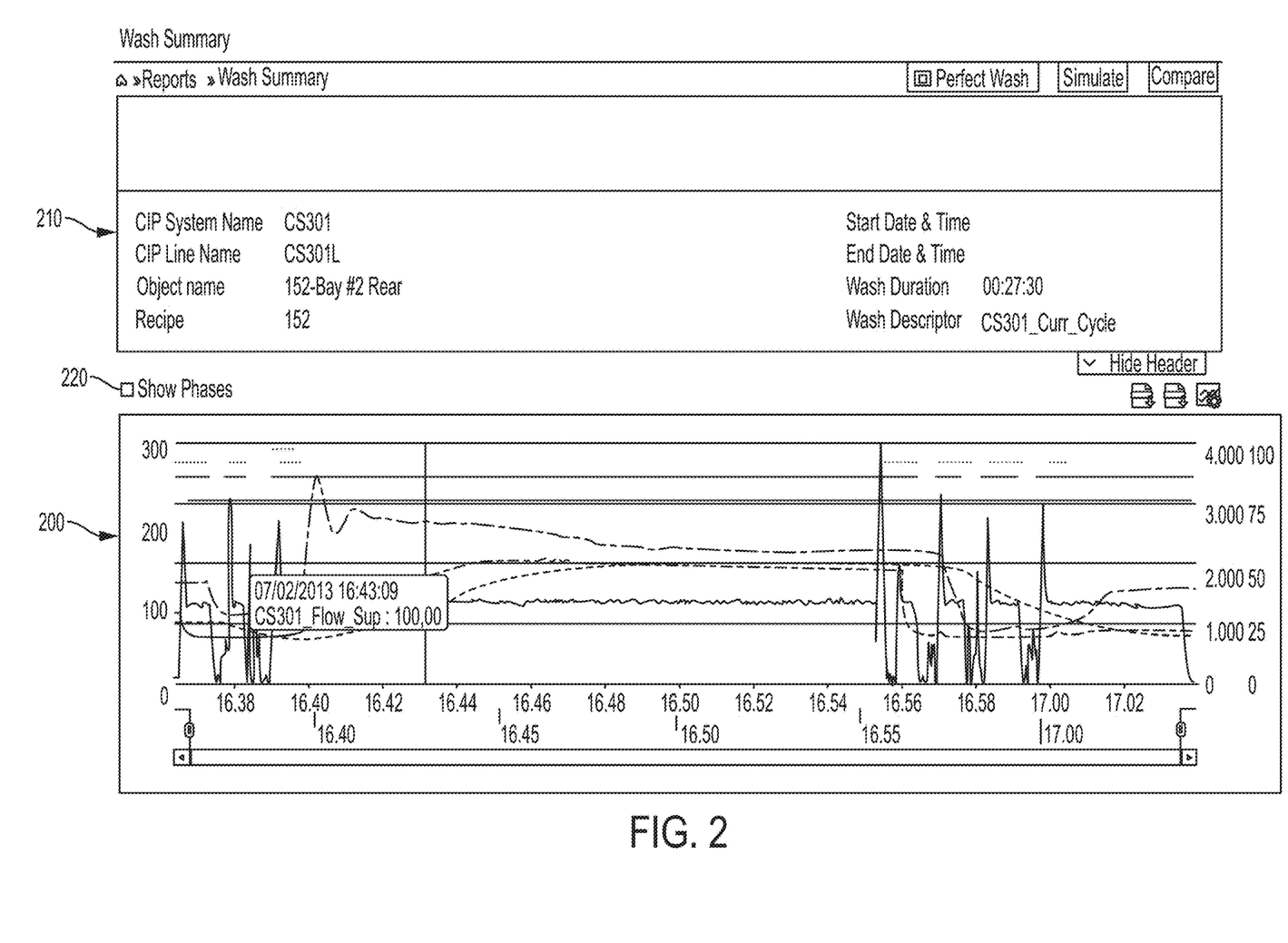
FIG. 2 is an exemplary view of a graphical aspect to a wash summary.

A system can include a user interface and/or a display for presenting a wash summary to a user. The wash summary can be presented to the user as a graphical object and/or textual information. FIG. 2 is an exemplary view of a graphical aspect 200 of a wash summary. As shown in the graphical aspect 200, various parameters are plotted over time during the course of a wash. Such parameters might include temperature, conductivity, pump operation, flow supply from a water or chemistry source, or other system parameters that may change over time. A header 210 can provide information regarding the wash, such as a CIP system name, an object name, a recipe number, start and end time and date, wash duration, and a wash descriptor. As shown, a "show phases" check box 220 is included, but unchecked. A user can elect to show temporal demarcations between various CIP phases within the wash by checking the check box 220. This helps a user easily view and interpret physical events that take place during each phase, and to observe when possible errors are occurring.

Figure 3:
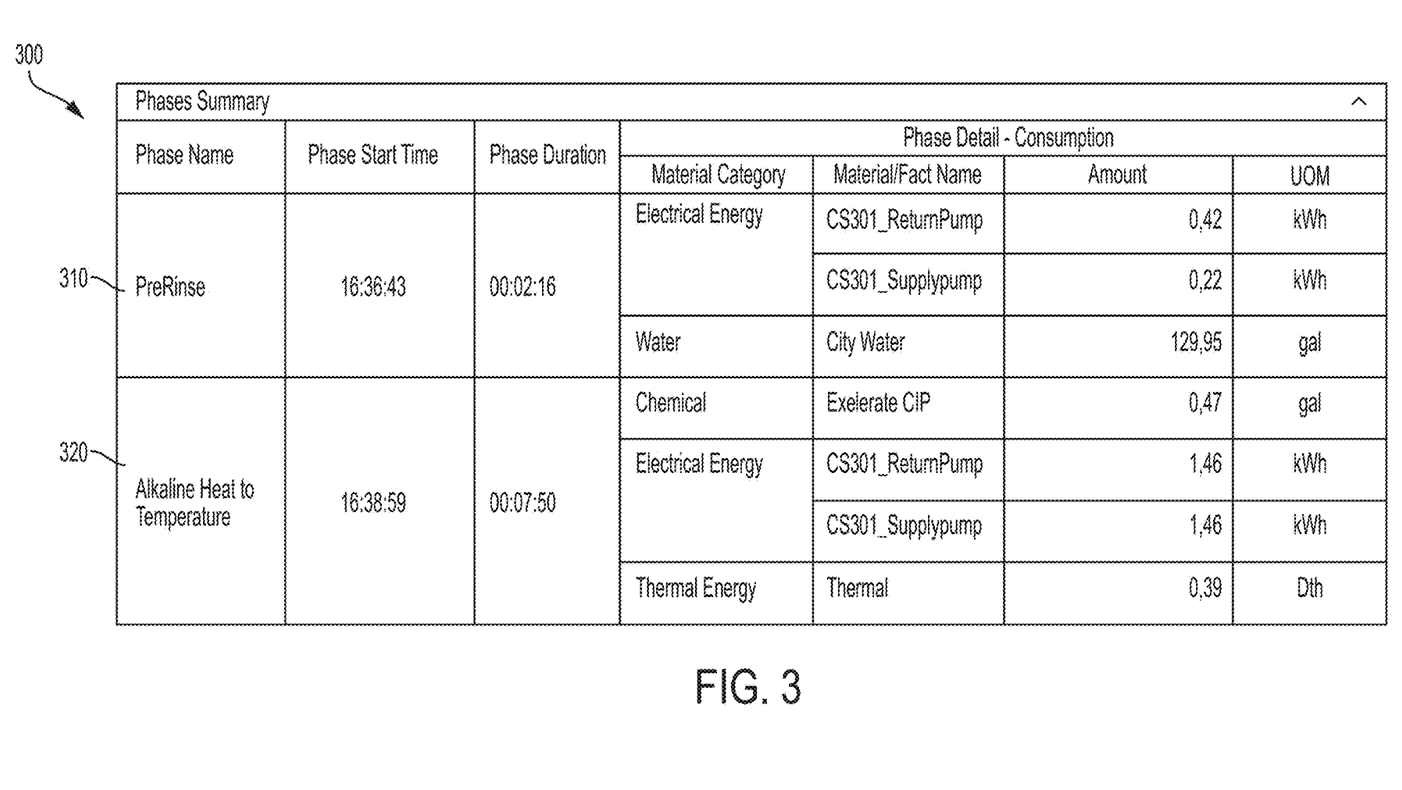
FIG. 3 is an exemplary display showing textual wash summary information.

FIG. 3 is an exemplary display 300 showing textual wash summary information. The data displayed on the display 300 in FIG. 3 is further broken down by phase with each phase 310, 320 of the wash having a dedicated row in which associated data is presented. Accordingly, a user can easily see information about each phase 310, 320 individually. For each phase 310, 320, a start time and duration are given, as well as a breakdown of the consumables used in each phase. For example, in the PreRinse phase 310 electrical energy was consumed by a return pump and a supply pump. The amount of electrical energy consumed by each is given in kWh. In addition, water consumed from the city water supply is given in gallons. Accordingly, the amount of consumables consumed by equipment operating in a given phase can be easily viewed by a user. A similar breakdown is shown of the Alkaline Heat to Temperature phase 320, wherein a consumed amount of chemical, electrical, and thermal energy are presented.

Figure 4:
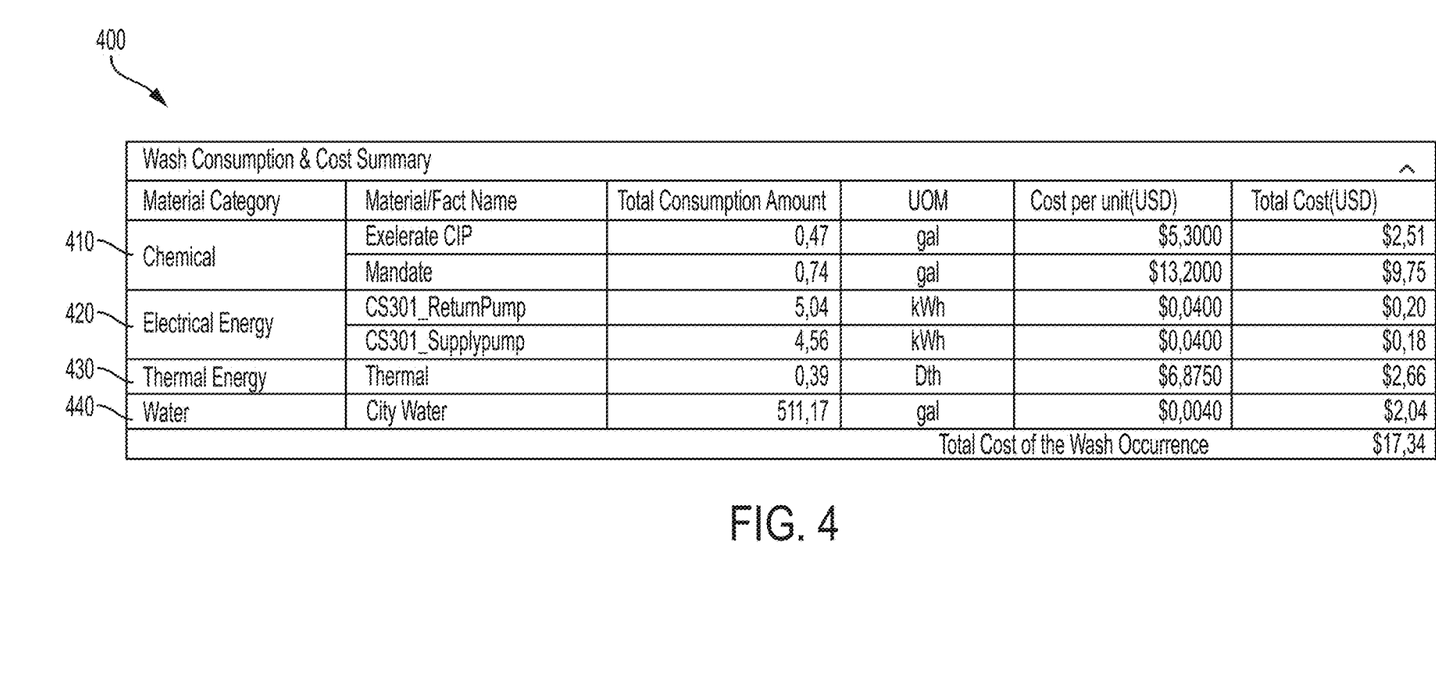
FIG. 4 is an exemplary display showing textual wash summary information.

FIG. 4 is an exemplary display 400 showing textual wash summary information. While in FIG. 3, the wash summary information is broken down by phase, the wash summary information in FIG. 4 is the entire wash duration broken down by consumable. FIG. 4 shows the consumption of chemicals 410, electrical energy 420, thermal energy 430 and water 440, broken down by corresponding equipment consuming them, through the course of the wash. The consumption amounts of each consumable are presented, along with the cost per unit of each. In some embodiments, the cost per unit of one or more consumables can be programmed into the controller. Additionally or alternatively, the controller can access the cost of one or more consumables automatically via a network such as the internet. The controller can utilize the cost per unit of the consumables and the total consumption amount to determine the total cost of each consumable consumed. Moreover, the total cost of the consumables consumed by each operating piece of CIP equipment is displayed. The controller can add the total cost of each consumed consumable to determine the total cost of the CIP wash.

For example, in the illustrative representation in FIG. 4, the material category labeled 'chemical' encompasses two different chemicals—Exelerate CIP and Mandate. Different amounts of each chemical were consumed and each has a different cost per unit. Accordingly, the total cost of using each chemical separately can be determined. Similar analysis is performed between two separate pieces of CIP equipment under the category of consuming electrical energy—a return pump and a supply pump, as well as with water and thermal energy. In general, CIP wash data can be sorted by consumed consumables as shown in the example of FIG. 4. In this way, a user of a CIP system can easily see the amount of consumables each piece of CIP equipment is using and the total cost of each wash occurrence based on consumed consumables.

In some embodiments, the various exemplary views of FIGS. 2-4 can be presented to a user simultaneously via a display. In other embodiments, a user can select via a user interface the display mode in which to view certain representations of the wash summary data. In some embodiments, data within the wash summary is sortable by any of the displayed parameters, such as phase duration, cost, consumable, etc. Aspects of the wash summary displays of FIGS. 2-4 provide a user with detailed analysis of a CIP wash including individual phase summaries, sensor readings, consumable consumption, cost of each consumed consumable, and the total cost of the wash occurrence. Thus, a local user can easily breakdown and view phase and other wash details of a CIP wash quickly and easily without the assistance of a CIP expert.

With the level of information logged and available from the wash summaries, a system operator can monitor various parameters within a CIP wash for occurrences of particular events. For example, a user can note if a temperature of a CIP process solution exceeded a particular threshold, or failed to reach a minimum threshold. In general, parameters that can be measured (e.g., time, temperature, conductivity, volume, etc.) can be compared to user-defined thresholds or set points, and the system can flag or otherwise alert the user if the wash parameter failed to meet one or more criteria. A user can define exceptions within the system to flag such instances.

Figure 5:
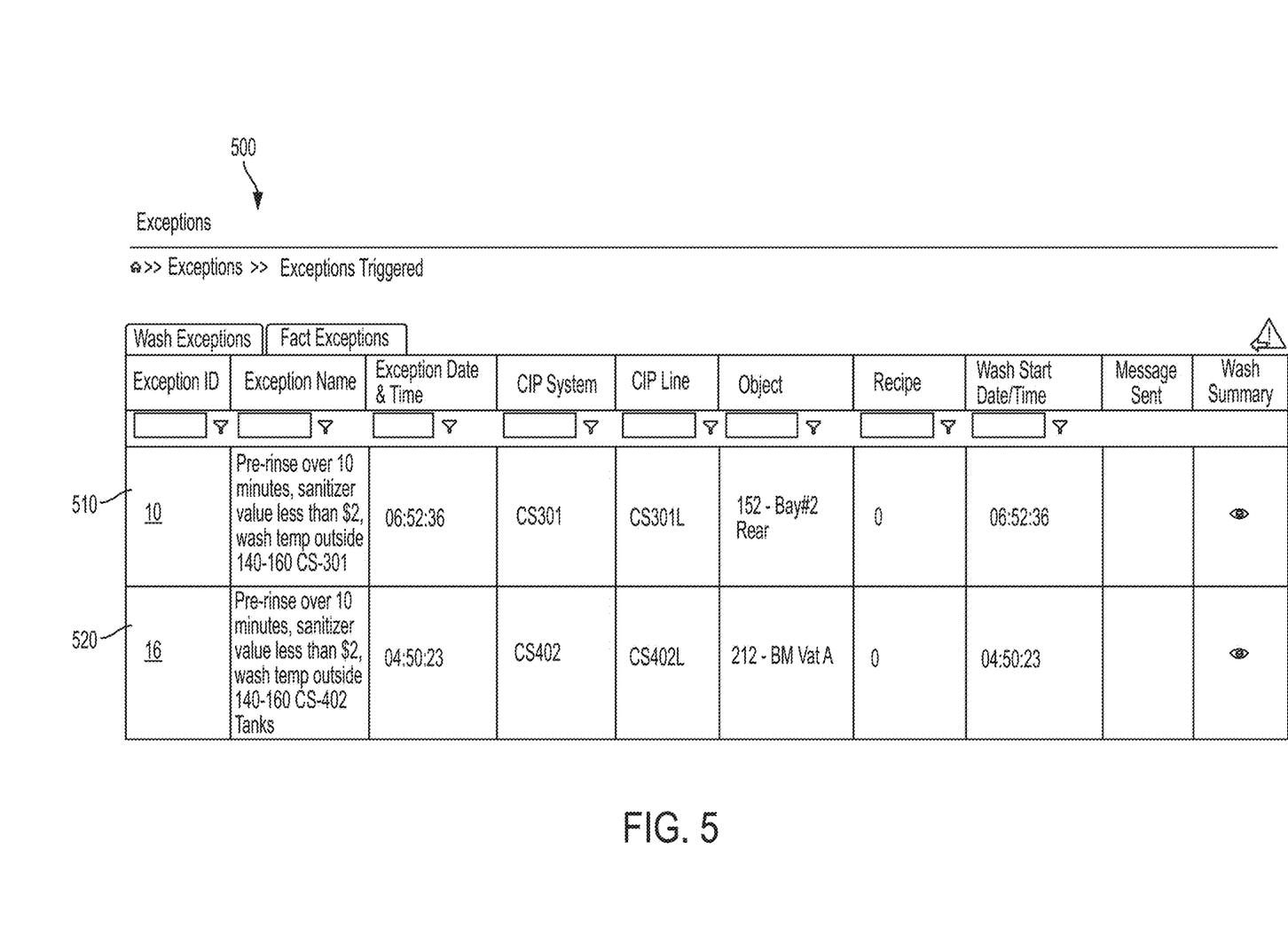
FIG. 5 is a graphic representation highlighting exemplary exceptions triggered in a CIP system.

FIG. 5 is a graphic representation 500 highlighting exemplary exceptions 510, 520 triggered in a CIP system. The graphical representation 500 of FIG. 5 provides a variety of information to a user, including an exception name, exception date and time, the CIP system and line in which the exception occurred, the object being washed, the wash recipe, and the wash start date and time for each exception 510, 520. Various other pieces of information available from the system can be similarly presented to a user. Exemplary exceptions might include one or more of the aforementioned thresholds. For instance, in an exemplary exception of FIG. 5, the exception 510 name includes a pre-rinse duration, a sanitizer value, and a wash temperature all meeting certain criteria to trigger the exception.

In general, any number of exceptions can be triggered during one or more CIP washes. Triggered exceptions can be presented to a user via an interface such as that shown in FIG. 5. In an instance in which multiple exceptions are triggered by one or more CIP washes, the presented list of exceptions can be sortable by any number of presented parameters. Accordingly, a user can observe exceptions triggered in washes including a common CIP object, line or system. The exceptions presented to a user allow the user to observe and troubleshoot potential problems in a CIP system without requiring a CIP expert to interpret the CIP data. User-defined exceptions further allow a user to monitor specific parameters of interest within a CIP system.

In some embodiments, the CIP system can communicate data including exceptions to a remote facility via a network such as the internet. For example, certain exceptions can trigger a message or other information to be communicated to a system analyst or service personnel. The exemplary displayed exceptions page of FIG. 5 includes a Message Sent column by which the system can indicate to a local user whether or not a triggered exception 510, 520 was reported via a message. In some embodiments, a user can define which exceptions will automatically send a message to a remote facility when triggered. For instance, when exception 510 is triggered a user can define that exception 510 be automatically sent to a remote facility via a message, while when exception 520 is triggered a user can define that exception 520 not be sent automatically to the remote facility (e.g., triggered exception 520 can be sent manually by the user when desired). This can allow for faster analysis and/or service of a system by a system expert or service personnel.

Operation of the CIP system can be embodied in a method for monitoring a CIP process that has been previously performed. For example, the method could include accessing, using one or more programmable processors, CIP process data stored in a CIP library. The CIP library can be a readable memory configured to store CIP data logged from a CIP process. The CIP process data can include CIP phase data, equipment data, and/or consumable data. The CIP process data can be associated with a plurality of CIP phases in the CIP process. The equipment data can be associated with objects cleaned or other equipment used in the CIP process. The consumable data is associated with consumable consumed by corresponding equipment and objects in the CIP process. The method can further include displaying with the one or more programmable processors, at least a portion of the CIP process data. In various examples, data can be displayed graphically as a plot, such as in FIG. 2, or as a set of textual data such as in FIGS. 3 and 4. The method can include providing a graphical user interface configured to organize the CIP process data into at least one of a plurality of phases, such as in FIG. 3 or consumable data as in FIG. 4. The graphical user interface can further sort equipment data according to each of the plurality of corresponding CIP phases or corresponding consumables. In various embodiments, a user can determine how CIP data is sorted on the graphical user interface. In general, such methods can be used to create a CIP wash summary in which CIP process data is organized and presented to a user. Generation of the wash library can contextualize CIP data such that a system user can easily observe and monitor details of CIP washes without requiring the services of an industry expert.

Figure 6:
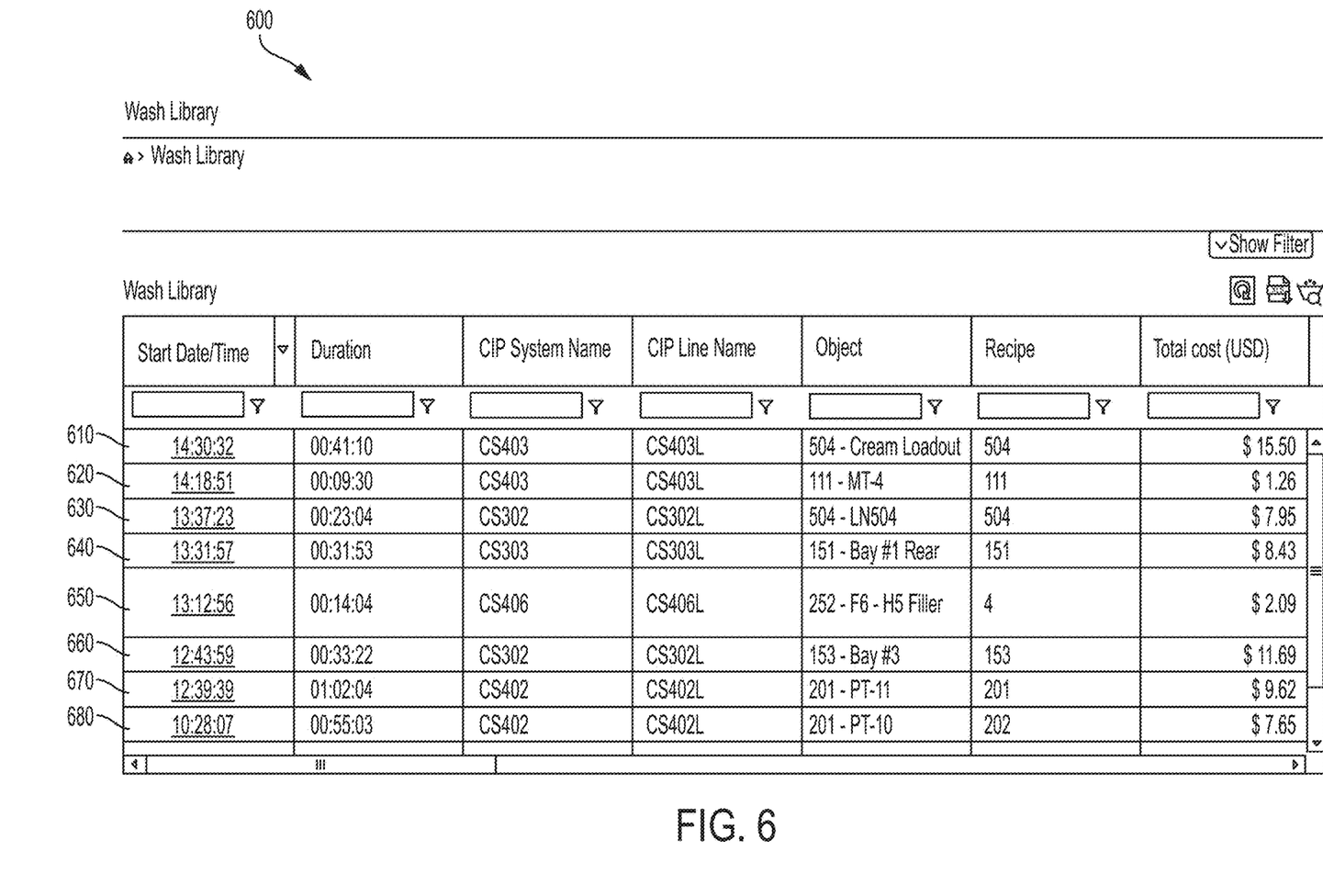
FIG. 6 is an exemplary view of a wash library interface.

Sets of CIP data, for example one or more wash summaries, can be saved as data sets for future recall. For example, a plurality of wash summaries can be stored together and cataloged in a wash library. FIG. 6 is an exemplary view of a wash library interface 600. In the illustrated example, the wash library includes a plurality of washes 610-680 each identified by time stamp, duration, CIP system name, CIP line name, object washed, recipe and cost. The various CIP washes in the wash library can be sorted by any such category so that a user can easily compare like washes, view completed washes, view the most expensive washes, or perform other analysis of a plurality of washes. In some embodiments, a user can select a wash from within the wash library in order to access individual wash summaries and view CIP wash data in greater detail as described above.

Figure 7:
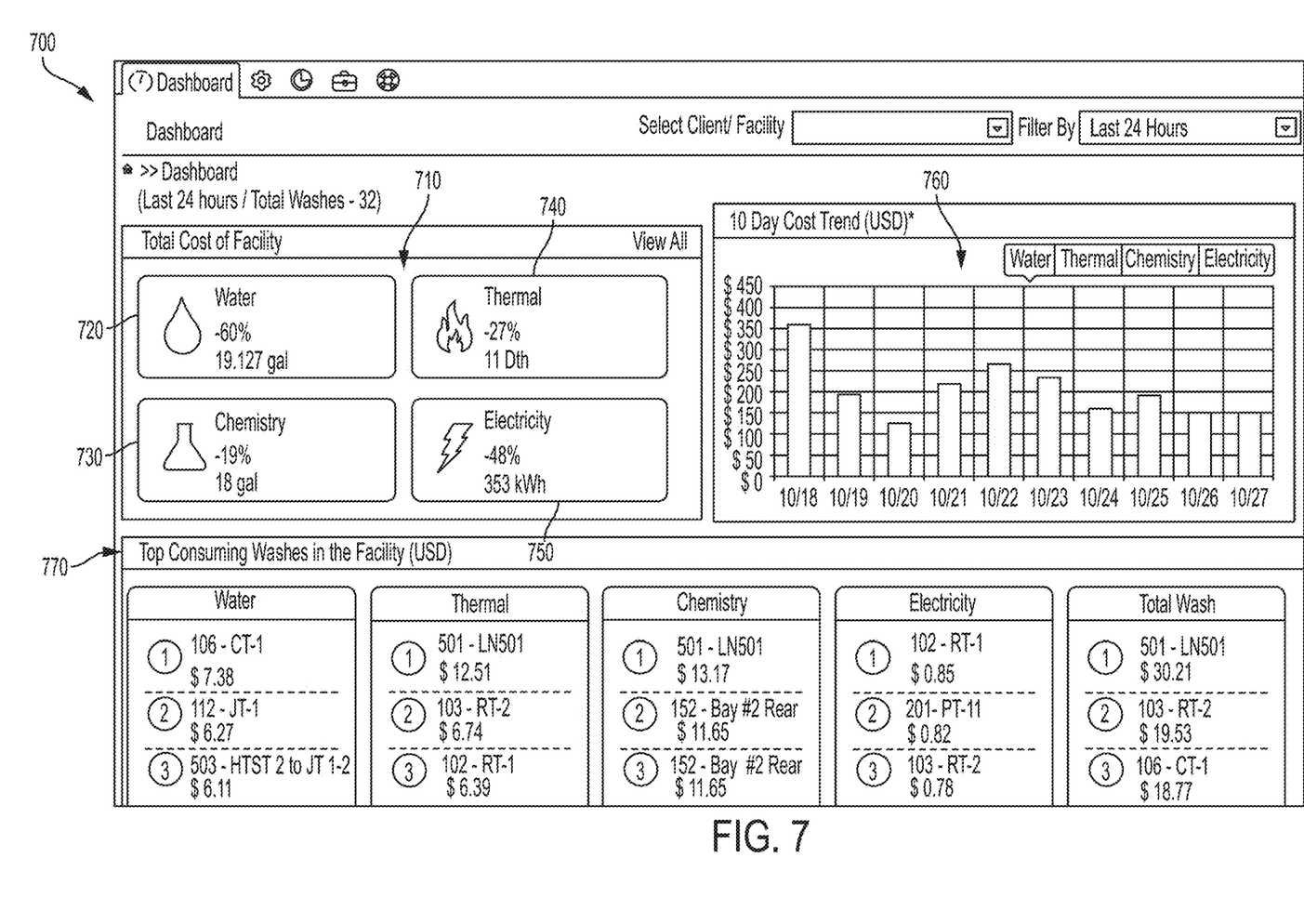
FIGS. 7 and 8 are views of an exemplary dashboard for use with a CIP system.
Figure 8:
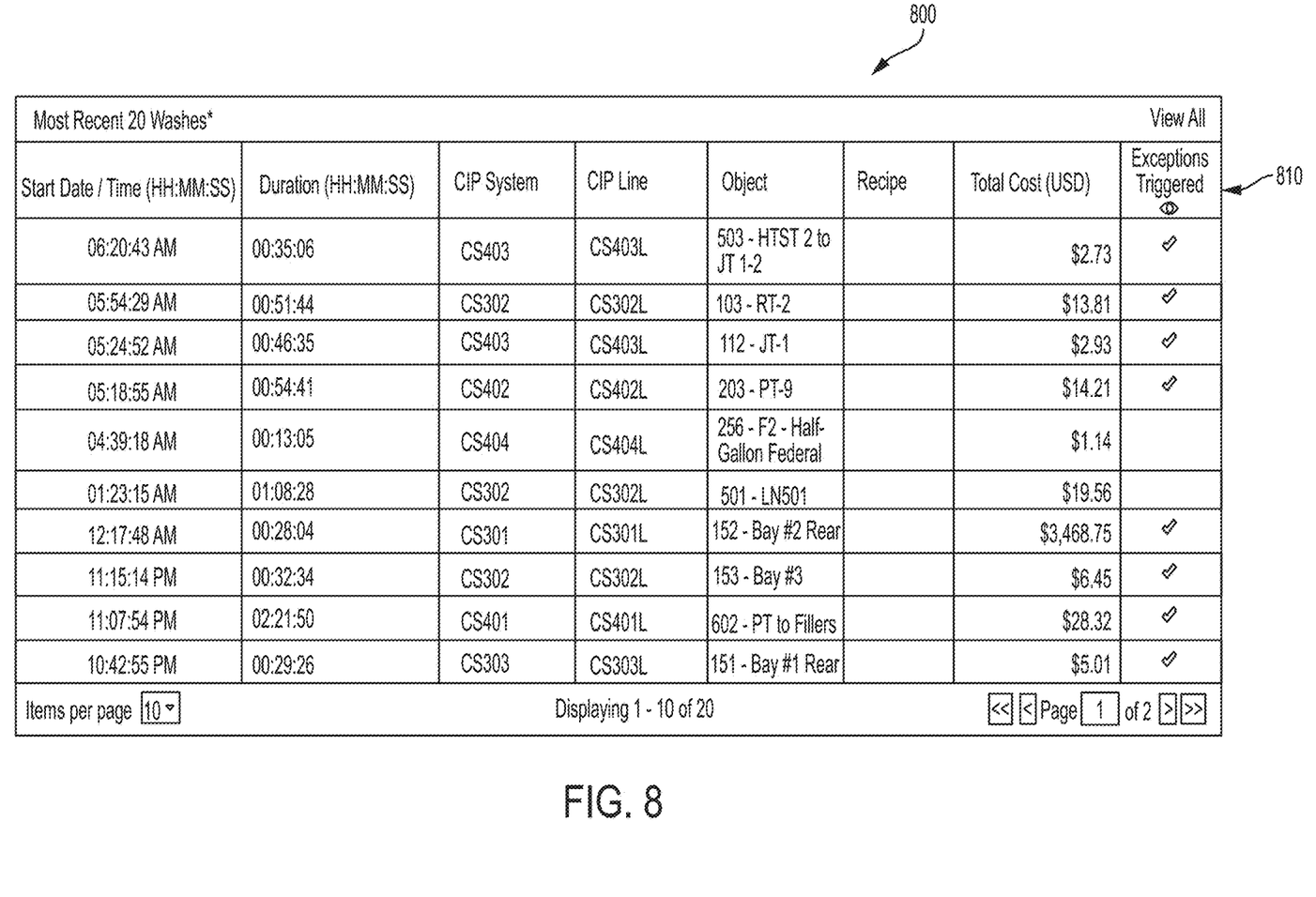

In some embodiments, a user can be presented with an overall CIP system summary page. The page can be referred to as a dashboard, providing many relevant details to a system user in one place. FIGS. 7 and 8 are views of an exemplary dashboard for use with a CIP system. In the view of FIG. 7, a user is presented with a summary 700 of a number of past washes. The dashboard provides a total cost graphic 710 comparing the total cost of the facility over, for example, a 24-hour span to previous data, reflecting the changes as a percentage. Compared data can be broken down by consumable. For instance, in the illustrated example, the total change in cost for water 720, chemistry 730, thermal energy 740, and electrical energy 750 are each displayed. The dashboard of the illustrated embodiment further includes a cost trend 760 display by which a user can observe the total cost of facility operation over a defined duration and time period. For example, in the illustrated embodiment, the daily cost of operation is presented over a 10-day time period. In some embodiments, the cost trend display can show the trending costs of any of the measurable consumables over the designated time period.

The dashboard can further include wash-specific information. For example, in the summary display 700 of FIG. 7, the dashboard provides data concerning the top consuming washes across a facility. As shown, the dashboard in the illustrative example shows at region 770 the top three consuming washes separated by consumable. Thus, the user is provided with an instant view of which washes consume the most consumable for each consumable monitored by the system. In some embodiments, the interface allows the user to select a timeframe over which to view the dashboard data, allowing a user the option to compare wash data from a facility over a desired amount of time.

FIG. 8 is a view of additional dashboard information. In some embodiments, the dashboard information of FIGS. 7 and 8 are presented on different screens between which a user can navigate. In other embodiments, the information presented in FIGS. 7 and 8 are part of the same display. The section 800 of the dashboard shown in FIG. 8 includes wash data for the most recent twenty washes. In some embodiments, this view is similar to a subset of the wash library, by which the user is presented with a high-level view of individual wash information. Similar to the wash library, a user can view a wash's time stamp, duration, CIP system, CIP line, object washed, recipe (if applicable) and total cost. A user can also view whether or not one or more exceptions were triggered during the wash at region 810. In some embodiments, each wash presented in the dashboard is selectable, enabling a user to quickly view more wash details in the particular wash summary.

Various methods of cataloging, arranging, and viewing CIP data have been described. Data can be collected and assembled into a wash summary in order to provide a user with contextualized CIP data, enabling the user to quickly and easily observe wash details including information regarding various phases and consumables used in each phase and by each piece of operating equipment. A user can also view a plurality of past washes in a cataloged wash library. From the wash library, a user can easily look up details from any saved wash. In addition, wash summaries and the wash library can provide information to a user regarding the triggering of an exception during a particular wash or phase. This can provide the user immediate feedback regarding a certain predetermined event occurring within a wash.

Such systems can be connected to a network such as the internet to allow remote viewing of the wash library or wash summaries. For instance, a system operator can observe wash details via a wash summary, look up previous washes in the wash library, or receive notice of triggered exceptions in a location remote from the CIP system. In addition, network access allows service personnel or account or system managers to view operation details of the CIP system remotely. Accordingly, knowledgeable CIP personnel can quickly view system information from a remote location without the need to travel to the CIP system, which can save significant time in troubleshooting potential errors occurring in the CIP system. Utilizing embodiments disclosed herein, a system user with limited CIP knowledge can quickly and easily observe contextualized CIP data and more readily notice change or degradation in system performance. In such a case, the user can observe the contextualized CIP data to locate the source of the changing operation, or otherwise provide a more detailed service request to more knowledgeable CIP system personnel. Subsequently, the more knowledgeable CIP personnel can quickly access the CIP data in question to provide more immediate feedback and support.

In various embodiments, data lookup, saving, filtering, comparing, as well as receiving inputs from a user interface can be performed by one or more processors incorporated into the system. The one or more processors can be in communication with system memory for recalling wash summary data, cataloging wash summary data into a wash library, and indexing and filtering data in response to a user input. In some embodiments, the processor is configured to connect to a network such as the internet for determining the cost of consumables from a database, or otherwise receiving data from or communicating data to a remote location.

Various examples of the invention have been described. Although the present invention has been described in considerable detail with reference to certain disclosed embodiments, the embodiments are presented for purposes of illustration and not limitation. Other embodiments incorporating the invention are possible. One skilled in the art will appreciate that various changes, adaptations, and modifications may be made without departing from the spirit of the invention and the scope of the appended claims.

The invention claimed is:

1. A method for monitoring a clean-in-place (CIP) process comprising two or more CIP phases previously performed, the method comprising:
measuring, using a plurality of sensors of a CIP system, data during each CIP phase of each CIP process of a plurality of CIP processes to define a plurality of CIP data sets, each CIP data set of the plurality of CIP data sets being associated with a respective CIP process of the plurality of CIP processes, wherein each CIP phase comprises one of a rinse phase, an alkaline wash, an acid sanitize, a rinse recovery, a chemical recovery, and a sterilization, each CIP data set including data measured by the plurality of sensors for each CIP phase of the associated CIP process comprising a total CIP process duration, wherein each CIP data set further includes at least one of a total amount of consumables used in the associated CIP process, a CIP system name, a CIP line name, a name of an object upon which the associated CIP process is carried out, and a CIP recipe used, wherein at least one of the plurality of sensors is positioned in each of a water line used in one or more of the two or different CIP phases and in each chemistry line of a plurality of chemistry lines of the CIP system;

controlling, by a controller comprising one or more programmable processors, each CIP phase of each CIP process of the plurality of CIP processes;

controlling, by the controller, equipment used to perform each CIP process of the plurality of CIP processes;

storing, using the one or more programmable processors, the plurality of CIP data sets in a CIP library;

accessing, using the one or more programmable processors, the plurality of CIP data sets stored in the CIP library;

displaying, using the one or more programmable processors, at least a portion of the plurality of CIP data sets; and providing, using the one or more programmable processors, a graphical user interface configured to:

organize the CIP data sets of the plurality of CIP data sets process data into at least one of: (i) a plurality of CIP phases or (ii) consumable data, and sort equipment data according to one or more of the plurality of corresponding CIP phases or corresponding consumables.

2. The method of claim 1, wherein the graphical user interface is configured to organize the CIP process data into the plurality of CIP phases.

3. The method of claim 2, wherein the graphical user interface is configured to associate consumable data corresponding to each of the organized plurality of CIP phases and display the consumable data corresponding to each of the organized plurality of CIP phases.

4. The method of claim 1, wherein the graphical user interface is configured to sort equipment data according to corresponding consumables used by the equipment during the CIP process previously performed.

5. The method of claim 1, wherein displaying at least a portion of the CIP process data includes displaying an indication that an exception has been triggered based on a first data parameter included in the CIP process data for the CIP process previously performed being outside a first predetermined threshold for a value of the first data parameter.

* * * * *

UNITED STATES PATENT AND TRADEMARK OFFICE
CERTIFICATE OF CORRECTION

PATENT NO. : 12,086,739 B2
APPLICATION NO. : 16/986239
DATED : September 10, 2024
INVENTOR(S) : Joseph P. Curran et al.

It is certified that error appears in the above-identified patent and that said Letters Patent is hereby corrected as shown below:

On the Title Page

Column 1 Item (72), in "Inventors", Line 2, after "Finn" insert -- Schultz --

Signed and Sealed this
Twenty-ninth Day of April, 2025

Coke Morgan Stewart
*Acting Director of the United States Patent and Trademark Office*